United States Patent

Nakamura et al.

[11] Patent Number: 5,913,742
[45] Date of Patent: Jun. 22, 1999

[54] TENSIONER FOR AN ENDLESS TRANSMITTING MEMBER

[75] Inventors: Kensuke Nakamura; Kouji Hirano; Tomoki Okita; Shinji Yamada; Fuminori Kawashima, all of Wako, Japan

[73] Assignee: Honda Giken Kogyo Kabushiki Kaisha, Tokyo, Japan

[21] Appl. No.: 08/911,279

[22] Filed: Aug. 14, 1997

[30] Foreign Application Priority Data

Aug. 26, 1996 [JP] Japan ................................. 8-223847

[51] Int. Cl.⁶ ....................................................... F16H 7/08
[52] U.S. Cl. .............................................................. 474/110
[58] Field of Search ................................ 474/101, 109, 474/110, 111, 140

[56] References Cited

U.S. PATENT DOCUMENTS

| | | | |
|---|---|---|---|
| 5,073,150 | 12/1991 | Shimaya | 474/110 |
| 5,304,099 | 4/1994 | Deppe et al. | 474/110 |
| 5,366,415 | 11/1994 | Church et al. | 474/110 |
| 5,720,684 | 2/1998 | Mott | 474/110 |

FOREIGN PATENT DOCUMENTS 46-21307  7/1971  Japan .

*Primary Examiner*—Thomas R. Hannon
*Attorney, Agent, or Firm*—Nikaido, Marmelstein, Murray & Oram LLP

[57] ABSTRACT

A tensioner for an endless transmitting member is provided to reliably prevent the loosening of an endless chain, while preventing the occurrence of an incorrect meshing of the endless chain with sprockets. A plunger holder is biased in an advancing direction by the action of a first spring supported in a housing, and a plunger, carried in the plunger holder, is biased in an advancing direction by the action of a second spring having a spring constant larger than that of the first spring. Only the movement of the plunger holder in the advancing direction is permitted by a ratchet mechanism mounted between the plunger holder and the housing. During operation of the engine, the advancing movement of the plunger holder is inhibited by the hydraulic pressure transmitted to a hydraulic pressure chamber, and the plunger is advanced and retracted in accordance with a variation in tension of the endless chain. When the engine is stopped, the ratchet mechanism is operated in accordance with the elongation of the endless chain due to wearing to advance the plunger holder one pitch at a time along with the plunger.

6 Claims, 7 Drawing Sheets

1Pitch

1Pitch

TENSIONER FOR AN ENDLESS TRANSMITTING MEMBER

BACKGROUND OF THE INVENTION

1. Field of the Invention

The present invention relates a tensioner for an endless transmitting member which applies tension to the endless transmitting member to prevent the loosening of the transmitting member.

2. Description of the Prior Art

A tensioner for an endless transmitting member is known, for example, as shown in Japanese Utility Model Application Laid-Open No. 46-21307.

An endless chain for transmitting the rotation of a crankshaft of an engine to a cam shaft has a structure in which a large number of chain links are connected by pins. For this reason, if the endless chain is used over a long period, contact portions of the chain links and the pins become worn, so that the entire length of the endless chain is gradually increased. In a chain tensioner, it is necessary to compensate for the variation in tension due to the wearing and elongation of the endless chain, in addition to the variation in tension of the endless chain caused by the variation in revolution of the engine and the variation in tension of the endless chain caused by thermal expansion. For this reason, the stroke of a plunger for applying tension to the endless chain must be set at a sufficiently large value. However, if the stroke is set at a large value, there is a possibility that the endless chain may ride across the sprocket teeth when the tension of the endless chain is suddenly varied, thereby causing an incorrect meshing.

SUMMARY OF THE INVENTION

The present invention has been developed with the above circumstance in view, and it is an object of the present invention to provide a tensioner for an endless transmitting member, which is capable of preventing loosening, while also preventing the occurrence of incorrect meshing of the endless transmitting member and associated sprocket teeth.

According to the present invention, the advancing movement of a plunger holder is inhibited by a locking means during operation of the endless transmitting member. A spring biases the plunger in an advancing direction relative to the plunger holder whose advancing movement is inhibited, thereby preventing the loosening of the endless transmitting member which is urged by the plunger. If the inhibition of the advancing movement of the plunger holder by the locking means is released upon stopping of the endless transmitting member, the plunger holder is advanced to a position in which the load of another spring for biasing the plunger holder in an advancing direction and the load of the first-mentioned spring for biasing the plunger holder in a retracting direction, are balanced with each other, in accordance with the wearing and elongation of the endless transmitting member. In this way, since the plunger holder is advanced in accordance with the wearing and elongation of the endless transmitting member, the amount of plunger protruding in the advancing direction from the plunger holder is maintained substantially constant, irrespective of the elongation of the endless transmitting member. Thus, both the advancing and retracting movements of the plunger relative to the plunger holder are possible, thereby enabling the variation in tension of the endless transmitting member to be reliably buffered. Moreover, by the fact that the plunger holder is advanced, it is unnecessary to compensate for the variation in tension due to the wearing and elongation of the endless transmitting member by the further advancing movement of the plunger. Therefore, the stroke of the plunger can be set at a distance which is necessary but is a minimum to compensate for the variation in tension attendant on the rotation of the endless transmitting member, and it is possible to prevent the occurrence of incorrect meshing when the tension of the endless transmitting member is suddenly varied.

According to a further feature of the present invention, the plunger holder is biased backwards by a piston facing a rear portion of a hydraulic pressure chamber defined between a housing and the plunger holder, and the movement of the plunger holder in the advancing direction is inhibited during the operation of the endless transmitting member.

According to another feature of the present invention, the retracting movement of the plunger is buffered by a hydraulic buffer means. Therefore, when the tension of the endless transmitting member is increased, the plunger is slowly retracted under the action of the hydraulic buffer means. Thus, it is possible to prevent the juddering of the endless transmitting means due to the sudden retracting movement of the plunger.

According to still a further feature of the present invention, when the plunger is retracted, the oil forced out of the reaction chamber is passed through a constriction which produces a resistance. Thus, the plunger is slowly retracted under the resistance.

According to still another feature of the present invention, a ratchet mechanism is operated so that the plunger holder is moved only in the advancing direction, but not moved in the retracting direction. Therefore, when the endless transmitting member is worn and elongated, the plunger holder can be reliably advanced only through a necessary distance.

DETAILED DESCRIPTION OF THE PREFERRED EMBODIMENTS

Figure 1:
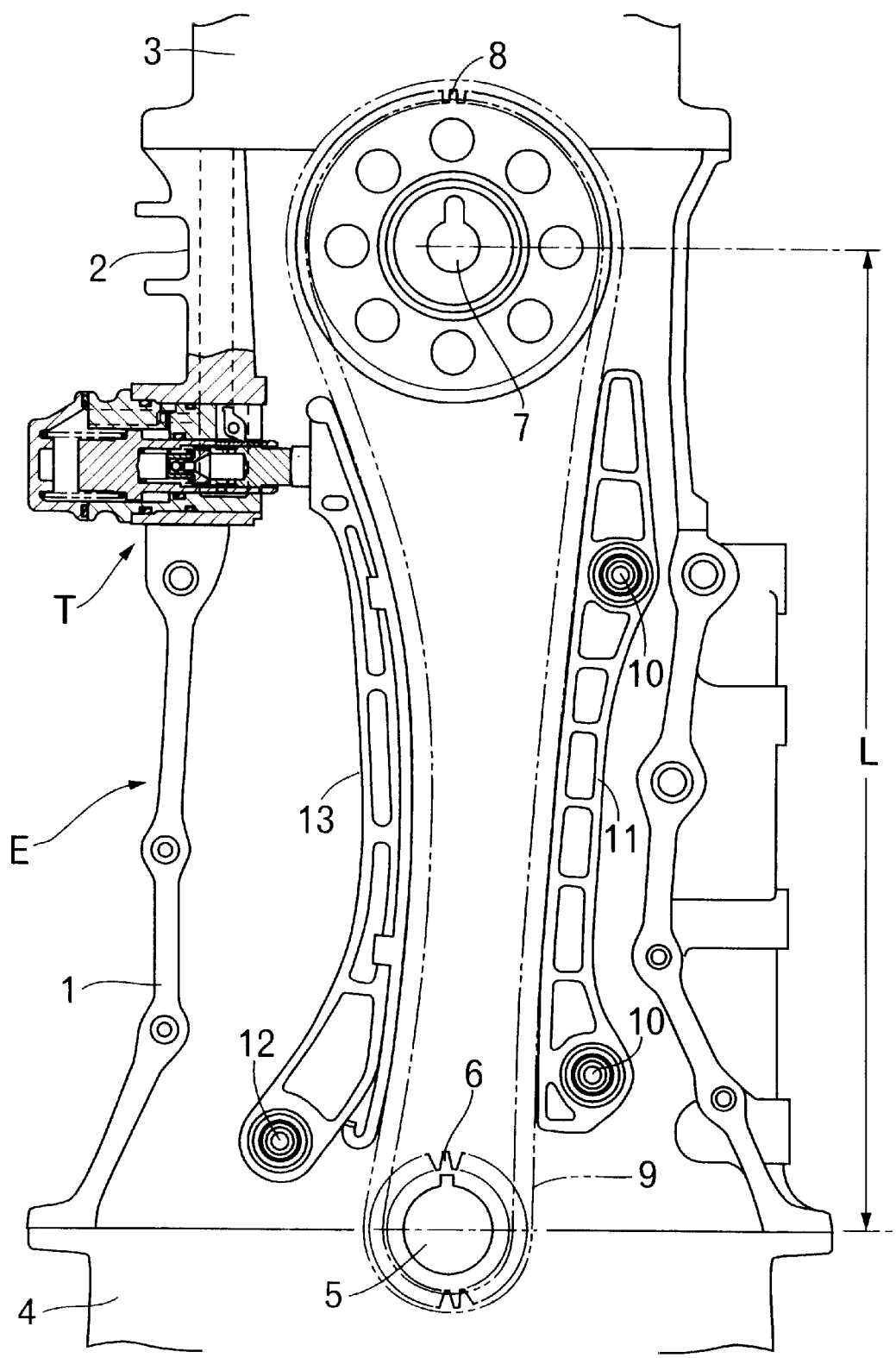
FIG. 1 is a vertical sectional view of an engine equipped with a chain tensioner.

As shown in FIG. 1, an SOHC type engine E includes a cylinder block 1, a cylinder head 2 coupled to an upper surface of the cylinder block 1, a head cover 3 coupled to an upper surface of the cylinder head 2, and an oil pan 4 coupled to a lower surface of the cylinder block 1. An endless chain 9 is reeved around a driving sprocket 6, mounted on a crankshaft 5, supported in the coupled surfaces of the cylinder block 1 and the oil pan 4, and around a follower sprocket 8 mounted on a cam shaft 7 supported in the cylinder head 2. The cam shaft 7 is driven by the crankshaft 5 at a rotational speed of one half of that of the crankshaft 5. The cylinder block 1 and the cylinder head 2 are made of an aluminum alloy. If the temperature is raised by the operation of the engine E, the distance L between axes of the crankshaft 6 and the cam shaft 7 is increased by thermal expansion.

A substantially rectilinear stationary shoe 11 fixed to the cylinder block 1 by two bolts 10, is put into contact with a tensioned side of the endless chain 9 drawn into the driving sprocket 6, and an arcuate movable shoe 13 rotatably supported at its lower end in the cylinder block 1 through a fulcrum pin 12, is brought into contact with a loosened side of the endless chain 9 forced out from the driving sprocket 6. An upper end of the movable shoe 13 is biased toward the endless chain 9 by a hydraulic chain tensioner T mounted in the cylinder head 2, and a predetermined tension is applied to the endless chain 9 by a biasing force of the chain tensioner T.

The structure of the chain tensioner T will be described with reference to FIGS. 2 to 5.

Figure 2:
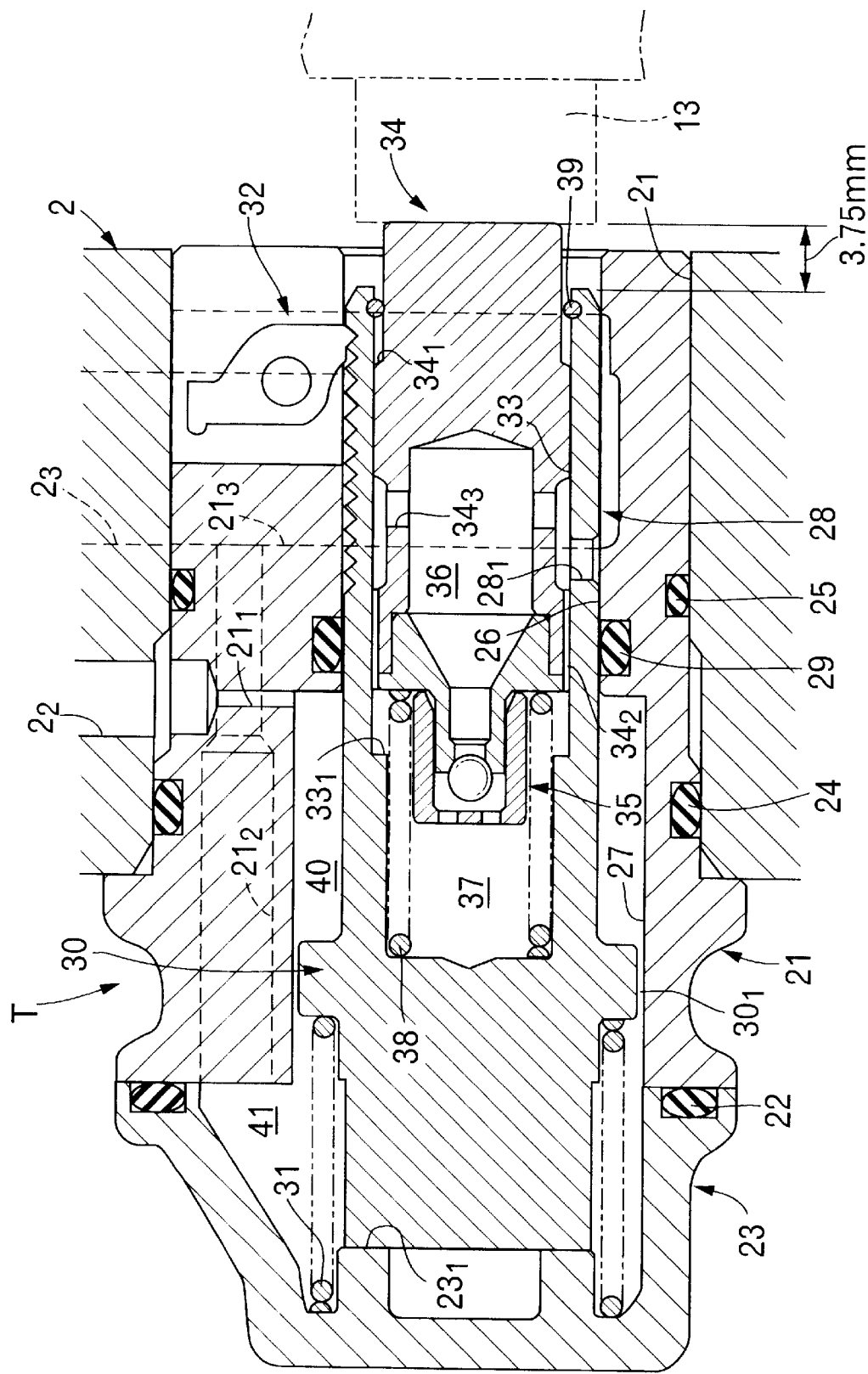
FIG. 2 is a vertical sectional view of the chain tensioner in a retracted state of a plunger holder.

As shown in FIG. 2, the chain tensioner T includes a substantially cylindrical housing 21, and an end cap 23 coupled to a rear end of the housing 21 with a seal member 22 interposed therebetween. The housing 21 is inserted into a mounting bore $2_1$ through a wall surface of the cylinder head 2, and is fixed by a bolt (not shown). Two seal members 24 and 25 are interposed therebetween. A first cylinder 26 of a smaller diameter is defined in a front portion of the housing 21, and a second cylinder 27 of a larger diameter is defined in a rear portion of the housing 21.

A front portion of a substantially cylindrical plunger holder 28 is slidably carried in the first cylinder 26 in the housing 21 with a seal member 29 interposed therebetween. A collar-like piston 30 formed around an outer periphery of a rear portion of the plunger holder 28, is slidably positioned in the second cylinder 27 in the housing 21. A very small clearance $30_1$ is defined between the piston 30 and the second cylinder 27, so that oil can pass through the clearance $30_1$. The plunger holder 28 is biased in an advancing direction (in a rightward direction as viewed in FIG. 2) by a first spring 31 which is disposed between the end cap 23 and the piston 30. The movement of the plunger holder 28 in the advancing direction is, however, limited by a locking means which is mounted between the housing 21 and the front portion of the plunger holder 28. The locking means comprises the piston 30 and a hydraulic pressure chamber 40. When the endless chain 9 is still new, the plunger holder 28 is at a retracted end position shown in FIGS. 2 to 4, and at this time, the rear end of the plunger holder abuts against a stopper $23_1$ provided on the end cap 23.

Figure 5:
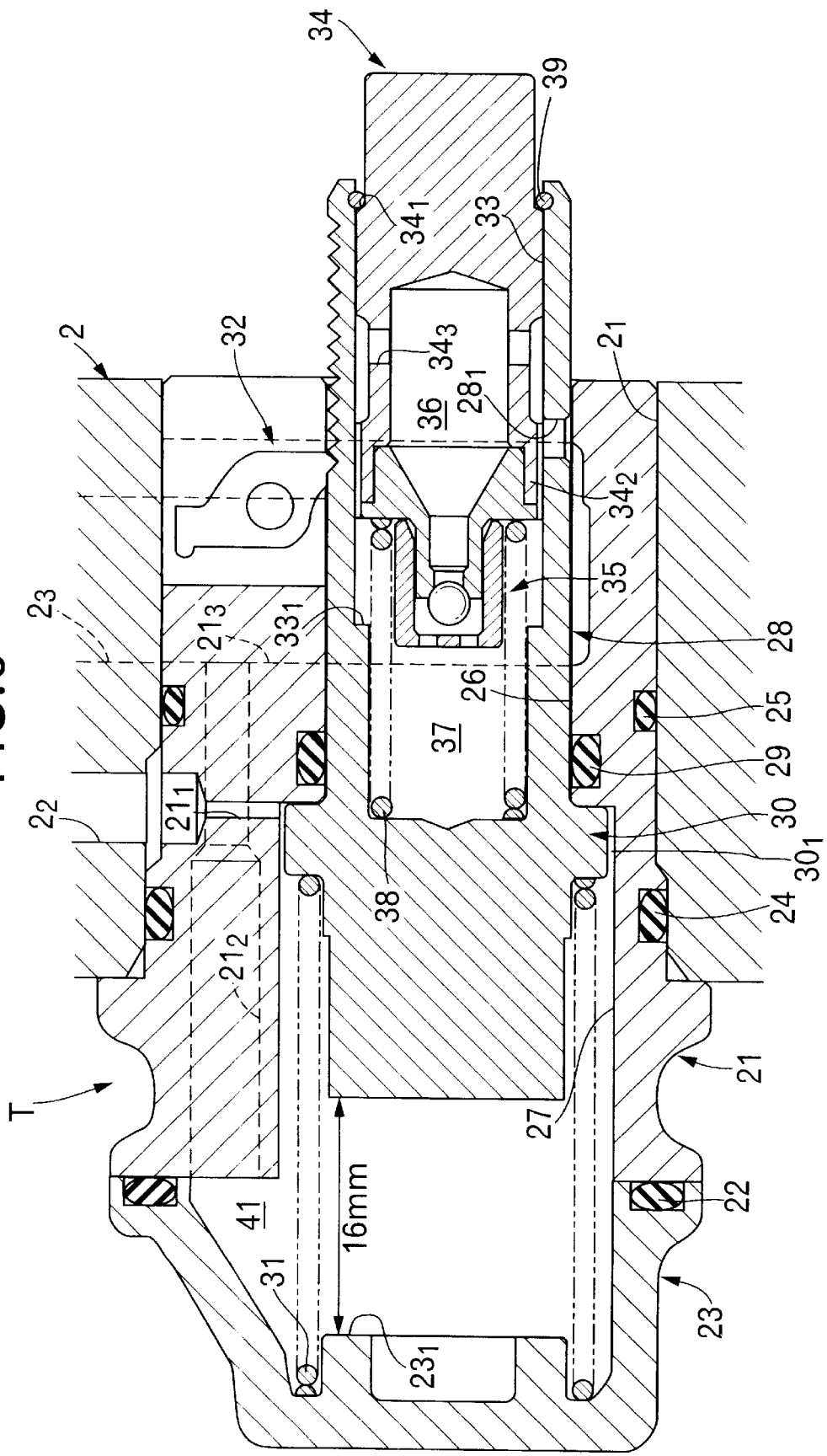
FIG. 5 is a vertical sectional view of the chain tensioner in an advanced state of the plunger holder.

If the endless chain 9 is used for a long period, contact portions between the chain links and the pins become worn and for this reason, the length of the endless chain 9 is gradually elongated. To compensate for such elongation of the endless chain 9, the plunger holder 28 is advanced one pitch at a time (1 mm) by the ratchet mechanism 32, and ultimately, reaches an advanced end position as shown in FIG. 5, at the end of the life of the endless chain 9 (when the elongation rate reaches 1%). The plunger holder 28 can be moved 16 pitches (16 mm) between the retracted end position shown in FIGS. 2 to 4 and the advanced end position shown in FIG. 5.

Figure 7A:
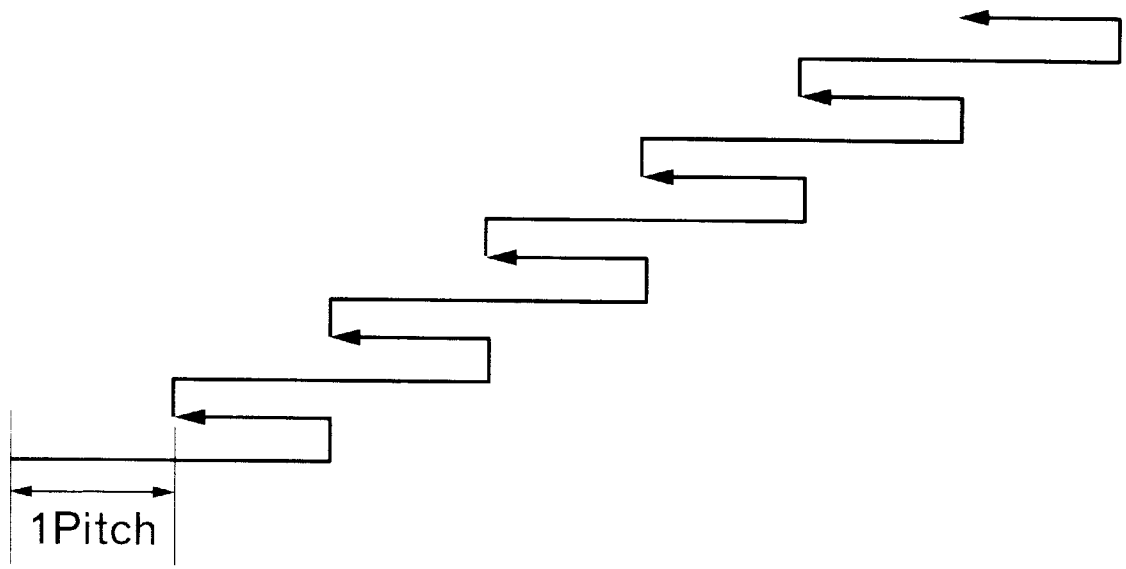
FIGS. 7A and 7B are graphs illustrating the characteristic of a ratchet mechanism.
Figure 7B:
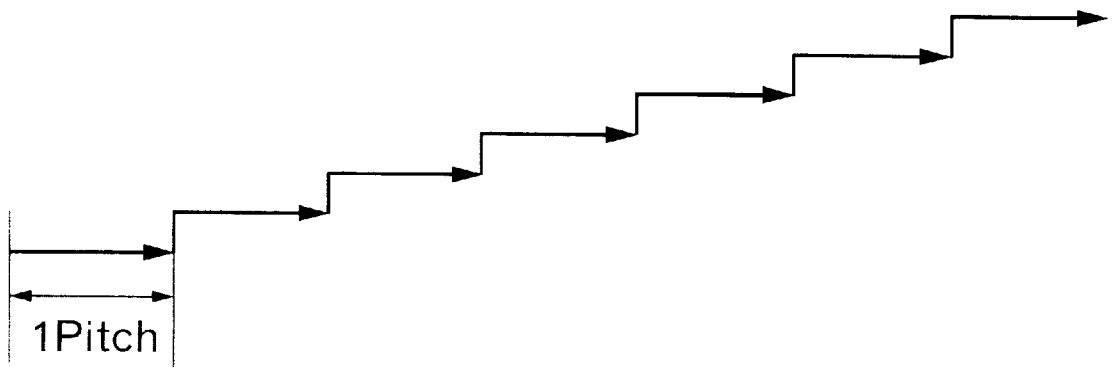

FIG. 7A shows the characteristic of the ratchet mechanism of an ordinary half-back type, wherein if the plunger holder is advanced one pitch, it is stopped at a position retracted by one half pitch. FIG. 7B shows the characteristic of a ratchet mechanism 32 of a non-back type in the preferred embodiment, wherein if the plunger holder 28 is advanced by one pitch, it is maintained at such advanced position without being retracted. Such a non-back type ratchet mechanism 32 is commercially available.

Returning to FIG. 2, a third cylinder 33 is axially defined in the plunger holder 28, and a substantially cylindrical plunger 34 is slidably carried in the third cylinder 33. Plunger 34 has a tip end which contacts the movable shoe 13. A check valve 35 provided at a rear end of the plunger 34, is adapted to permit the flow of oil from a reservoir chamber 36 defined within the plunger 34, to a reaction chamber 37 defined in the third cylinder 33, but to inhibit the flow of oil from the reaction chamber 37 to the reservoir chamber 36. The reaction chamber 37 and the reservoir chamber 36 communicate with each other through a constriction $34_2$ defined around an outer periphery of the plunger 34.

The plunger 34 is biased in an advancing direction by the action of a second spring 38 positioned in the reaction chamber 37. When the plunger 34 is at the advanced end position shown in FIG. 4, a step $34_1$ of the plunger 34 is in contact with a clip 39 mounted at an opening in the third cylinder 33. When the plunger 34 is at the retracted end position shown in FIG. 3, the rear end of the plunger 34 is in contact with a step $33_1$ of the third cylinder 33. The plunger 34 can be stroked 7.5 mm between the advanced end position shown in FIG. 4 and the retracted end position shown in FIG. 3 (see FIG. 3).

The first spring 31 has a spring constant which is set smaller than that of the second spring 38. As can be seen from FIG. 6, in a state in which the first spring 31 has been most compressed (see FIGS. 2 to 4), the load of the first spring 31 for biasing the plunger holder in the advancing direction is 4 kg, and in a state in which the first spring 31 has been most expanded (see FIG. 5), such load is 3 kg. Namely, the load of the first spring 31 is linearly varied from 4 kg to 3 kg while the plunger holder 28 is stroked 16 mm in the advancing direction. On the other hand, in a state in which the second spring 38 has been most compressed (see FIG. 3), the load of the second spring 38 for biasing the plunger holder 28 in the retracting direction is 7 kg, and in a state in which the second spring 38 has been most expanded (see FIG. 4), the load of the second spring 38 for biasing the plunger holder 28 in the retracted direction is 1 kg. Namely, the load of the second spring 38 is linearly varied while the plunger 34 is stroked 7.5 mm in the expanding direction.

The cylinder head 2 is provided with an oil passage $2_2$ to which oil is supplied from an oil pump (not shown). The oil passage $2_2$ communicates with the hydraulic pressure chamber 40 defined in the front portion of the piston 30 through a constriction $21_1$ defined in the housing 21. The hydraulic pressure chamber 40 communicates with a spring accommodating chamber 41 having the first spring 31 positioned therein, through the clearance $30_1$ around the outer periphery of the piston 30. The spring accommodating chamber 41 communicates with atmosphere-opening bores $2_3$ and $21_3$ defined in the cylinder head 2 and the housing 21 through an oil passage $21_2$ defined in the housing 21. The atmosphere-opening bore $21_3$ defined in the housing 21 communicates with the reservoir chamber 36 through a through-hole $28_1$ defined in the plunger holder 28 and a through-hole $34_3$ defined in the plunger 34. When the engine E is mounted on a vehicle body, the atmosphere-opening bores $2_3$ and $21_3$ open into an upper portion of the first cylinder 26.

The operation of the embodiment of the present invention having the above-described construction will be described below.

Figure 3:
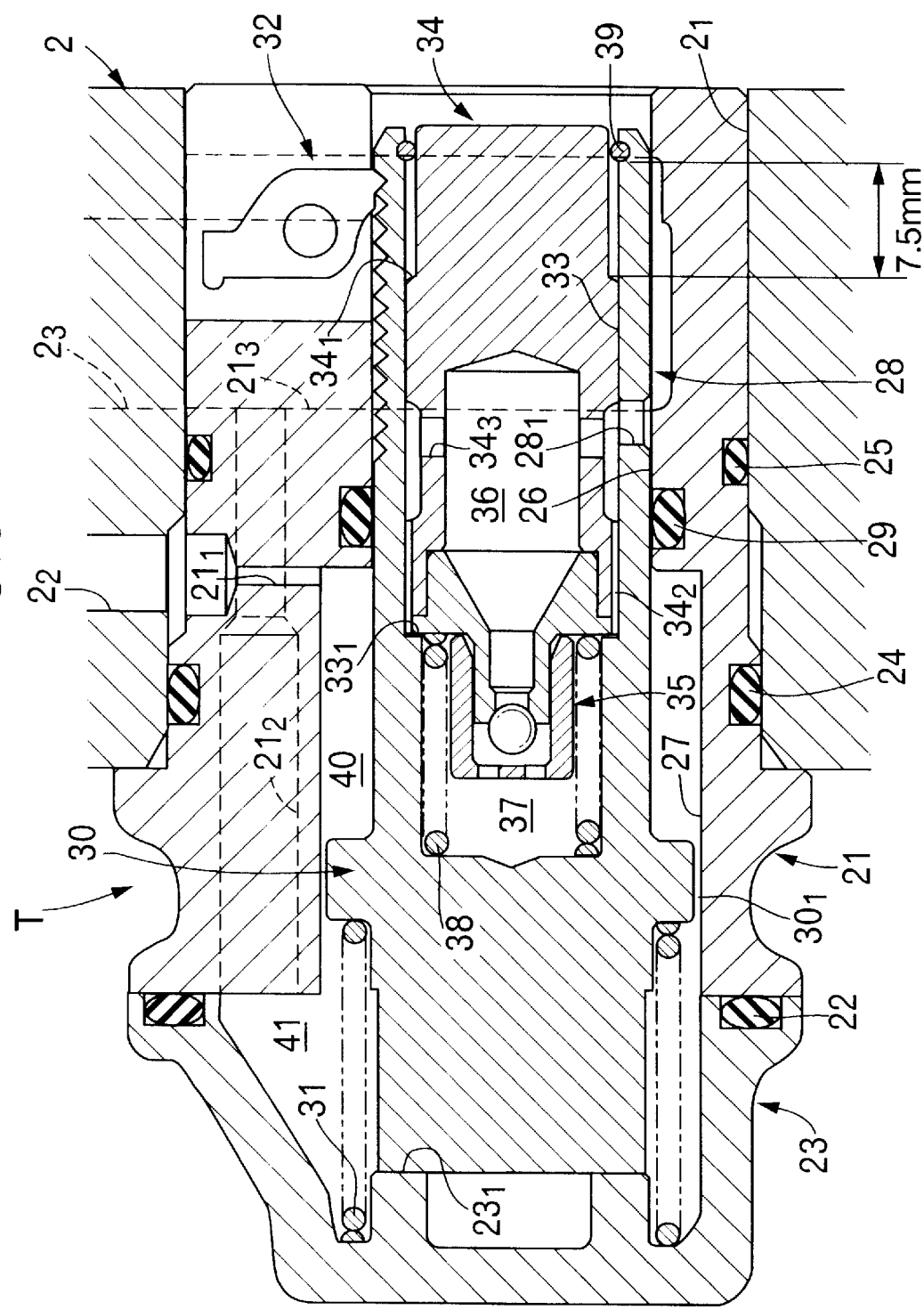
FIG. 3 is a view showing a plunger retracted in FIG. 2.
Figure 4:
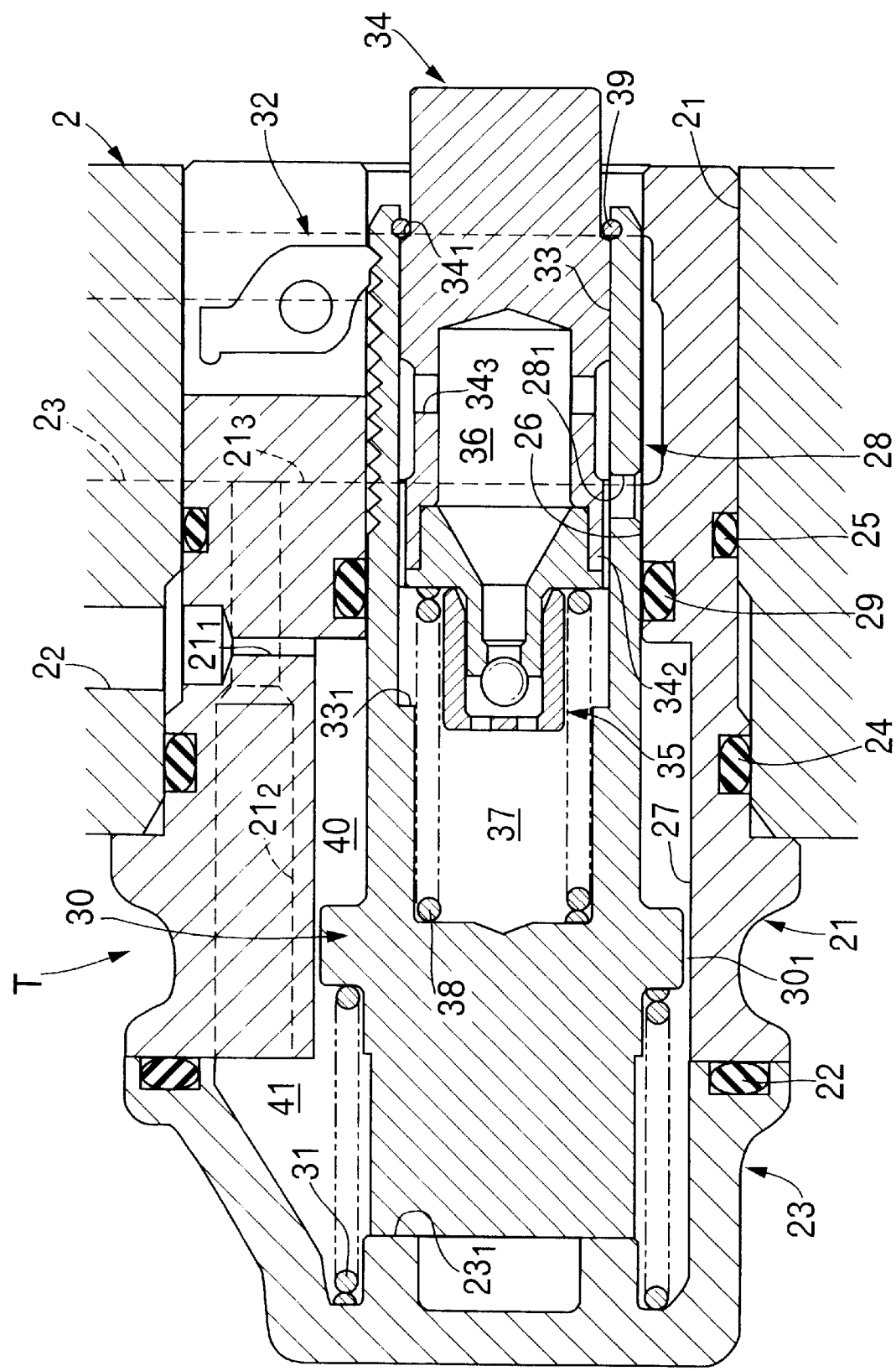
FIG. 4 is a view showing the plunger in an advanced state in FIG. 2.

When the endless chain 9 is new and has an expansion rate of 0% and the engine E is stopped in its low-temperature state, i.e., the engine E is in its cold stopped state, the oil pump of the engine E is also stopped. Hence, no hydraulic pressure is applied to the hydraulic pressure chamber 40 defined in front of the front surface of the piston 30 of the plunger holder 28. When the plunger holder 28 is at the retracted end position and the plunger 34 is also at the retracted end position, as shown in FIG. 3, a balance of the load acting on the plunger holder 28 is considered. Because no hydraulic pressure is applied to the hydraulic pressure chamber 40 when the engine E is stopped, as described above, a rightward load by the first spring 31 and a leftward load by the second spring 38 are applied to the plunger holder 28.

Figure 6:
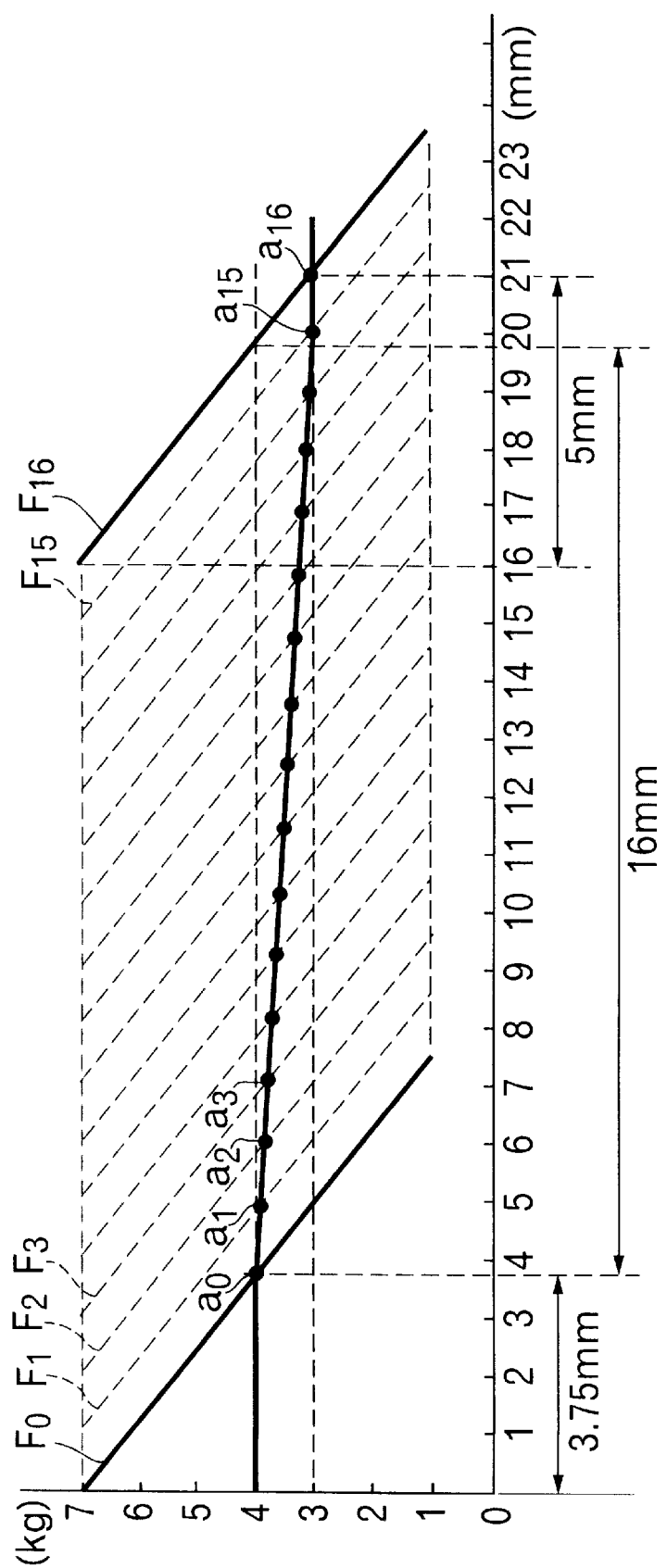
FIG. 6 is a graph for explaining the operation of the chain tensioner.

At this time, as is apparent from FIG. 6, the first spring 31 is in the most compressed state, and the rightward load is 4 kg. The second spring 38 is also in the most compressed state, and the leftward load is 7 kg. Therefore, the leftward load by the second spring 38 overcomes the rightward load, causing the rear end of the plunger holder 28 to be urged against the stopper $23_1$. When the plunger 34 is advanced from this state, the second spring 38 is expanded, so that the load for biasing the plunger holder 28 in the leftward direction is gradually decreased from 7 kg. When the amount of advancement of plunger 34 reaches 3.75 mm (see a point ao in FIG. 6) one half of 7.5 mm which is the maximum stroke of the plunger 34 as shown in FIG. 2, the load for biasing the plunger holder 28 in the leftward direction by the second spring 38 reaches 4 kg which is balanced with the load of 4 kg for biasing the plunger holder 28 in the rightward direction by the first spring 31.

At this point, the plunger 34 is biased in the advancing direction by the load of 4 kg from the second spring 38, but is stopped at the balanced position by a reaction force received from the movable shoe 13. In other words, when the expansion rate of the endless chain 9 is 0%, the dimensions and the characteristic of the chain tensioner T are set so that the load of the first spring 31 and the load of the second spring 38 are balanced with each other when the amount of plunger 34 advance is 3.75 mm.

Now, when the engine E is operated in the balanced state shown in FIG. 2, oil from the oil pump is supplied through the oil passage $2_2$ and the constriction $21_1$ to the hydraulic pressure chamber 40, thereby biasing the piston 30 in the retracting direction. The oil passed from the hydraulic pressure chamber 40 through the clearance $30_1$ around the outer periphery of the piston 30 into the spring accommodating chamber 41 is discharged through the oil passage $21_2$ into the atmosphere-opening oil passage $21_3$, but a portion of the oil is supplied from the atmosphere-opening oil passage $21_3$ through the through-hole $28_1$ and the through-hole $34_3$ into the reservoir chamber 36 and further supplied therefrom through the check valve 35 into the reaction chamber 37.

During operation of the engine E, the tension of the endless chain 9 is varied due to various factors. For example, if the distance L between the axes of the crankshaft 5 and the cam shaft 7 is increased due to thermal expansion, the tension of the endless chain 9 is increased. The tension of the endless chain 9 is varied between when the endless chain is tensioned and when the endless chain is loosened. Further, the tension of the endless chain 9 is increased or decreased depending upon the variation in the number of revolutions of the engine.

When the movable shoe 13 allows the plunger 34 of the chain tensioner T to be urged in the retracting direction as a result of an increase in tension of the endless chain 9, the volume of the reaction chamber 37 is decreased, so that the pressure in the reaction chamber 37 is increased. As a result, the check valve 35 facing the reaction chamber 37 is closed, thereby permitting the oil in the reaction chamber 37 to be moved through the constriction $34_2$, around the outer periphery of the plunger 34, toward the reservoir chamber 36, to inhibit the sudden retracting movement of the plunger 34. Thus, the increase in tension of the endless chain 9 can be slowly received to prevent the juddering of the endless chain 9 due to repulsion. Conversely, when the tension of the endless chain 9 is decreased, the plunger 34 is advanced by the biasing force of the second spring 38. In this case, the check valve 35 is opened, thereby permitting the oil in the reservoir chamber 36 to be moved to the reaction chamber 37 and hence, the plunger 34 is advanced promptly, thereby preventing the loosening of the endless chain 9. In this manner, the small variation in tension of the endless chain 9 caused during operation of the engine E, is inhibited by the chain tensioner T.

As described above, when the tension of the endless chain 9 is not varied, the plunger 34 is in the position shown in FIG. 2. This position corresponds to a position to which the plunger 34 has been advanced 3.75 mm from the retracted end position shown in FIG. 3, and a position to which the plunger 34 has been retracted 3.75 mm from the advanced end position shown in FIG. 4. Namely, it is possible to ensure the stroke of 3.75 mm in each of the advancing and retracting directions by the prior positioning of the plunger 34 in the center of the stroke of 7.5 mm, thereby accommodating the variations in tension of the endless chain 9 in the increasing and decreasing directions.

When the tension of the endless chain 9 is increased during operation of the engine E as described above, the retracted plunger 34 biases the plunger holder 28 in the retracting direction through the second spring 38, but the plunger holder 28 cannot be retracted, because it has been locked non-retractably by the ratchet mechanism 32. When the tension of the endless chain 9 is decreased during operation of the engine E, even if the plunger holder 28 biased by the first spring 31, is intended to be advanced after the plunger 34 which is being advanced, the plunger holder 28 cannot be advanced, because the hydraulic pressure from the oil pump is applied to the hydraulic pressure chamber 40 defined in front of the front surface of the piston 30, as described above. Namely, during operation of the engine E, the plunger holder 28 is fixed non-movably, and only the plunger 34 is moved in accordance with the variation in tension of the endless chain 9.

When at a high temperature immediately after the stopping of the operation of the engine E, the distance L between the axes of the crankshaft 5 and the cam shaft 7 has been increased. Therefore, the tension of the endless chain 9 is increased, and the plunger 34 is retracted beyond the neutral position shown in FIG. 2. When the engine E is then cooled and as a result, the axis-axis distance L is decreased, and the tension of the endless chain 9 is thus decreased, the plunger 34 is advanced by the resilient force of the second spring 38 and restored to the neutral position shown in FIG. 2. When the engine E is stopped, the supplying of the hydraulic pressure to the hydraulic pressure chamber 40 is stopped. However, even if the tension of the endless chain 9 is suddenly varied when the engine E is stopped or restarted, the unnecessary advancing movement of the plunger holder 28 is avoided, because the oil within the hydraulic pressure chamber 40 hardly leaks by virtue of the constriction $21_1$ and the clearance $30_1$.

If the endless chain 9 is gradually expanded by wearing due to the use for a long period, the distance of advancing movement of the plunger 34 toward the neutral position in the above-described cold stopped state is increased. When the engine E is stopped, the hydraulic pressure applied to the hydraulic pressure chamber 40 is stopped, and the plunger holder 28 is in a state in which it can be advanced by the resilient force of the first spring 31. Therefore, the ratchet mechanism 32 is operated to cause the plunger holder 28 to be advanced one pitch from the retracted end position shown in FIG. 2 to a position in which the resilient force of the first spring 31 for biasing the plunger holder 28 in the advancing direction, and the resilient force of the second spring 38 for biasing the plunger holder 28 in the retracted direction, are balanced with each other.

In this way, the ratchet mechanism 32 is operated in the cold stopped state of the engine E as a result of the expansion of the endless chain 9 due to wearing, thereby advancing the plunger holder 28 one pitch at a time. When the expansion rate of the endless chain 9 reaches 1% at the end of the lifetime of the endless chain 9, the plunger holder 28 has advanced 16 pitches (16 mm) to reach the advanced end position shown in FIG. 5. Therefore, the plunger holder 28 has 17 stopped positions in correspondence to the 16 pitches of the ratchet mechanism 32. In each of the stopped positions, the plunger 34 is stopped at the neutral position where the resilient force of the first spring 31 and the resilient force of the second spring 38 are balanced with each other. In this neutral position, the plunger 34 is in a state in which it has been advanced from the plunger holder 28 by approximately one half of 7.5 mm, which is the stroke of the plunger.

This will be further described with reference to FIG. 6. When the plunger holder 28 is in the retracted end shown in FIG. 2, the load of the second spring 38 is decreased along a straight line $F_0$ from 7 kg to 1 kg, while the plunger 34 is stroked 7.5 mm. Whenever the plunger holder 28 is advanced one pitch by the ratchet mechanism 2, the straight line showing the load of the second spring 38 is shifted to $F_0 \rightarrow F_1 \rightarrow F_2 \rightarrow [000c]\text{- - -} \rightarrow F_{16}$. On the other hand, the load of the first spring 31 is decreased from 4 kg to 3 kg, while the plunger holder 28 is advanced 16 pitches.

When the plunger holder 28 is in the retracted end position shown in FIG. 2, the first and second springs 31 and 38 are balanced with each other at the point $a_0$ on the straight line $F_0$. The distance of advancing movement of the plunger 34 at that time is 3.75 mm which is one half of the maximum stroke (7.5 mm), and the load of the second spring 38 at that time is 4 kg (the load of the first spring 31 is also 4 kg). When the plunger holder 28 is advanced one pitch by the ratchet mechanism 32, the load of the second spring 38 is varied along the straight line $F_1$, and the resilient forces of the first and second springs 31 and 38 are balanced with each other at a point $a_1$ on the straight line $F_1$. At this point, the distance of advancing movement of the plunger 34 is increased to a value slightly more than 3.75 mm, and the load of the second spring 38 is decreased to a value slightly smaller than 4 kg. When the plunger holder 28 is in the advanced end position shown in FIG. 5, the first and second springs 31 and 38 are balanced with each other at a point $a_{16}$ on the straight line $F_{16}$. The distance of advancing movement of the plunger 34 at that point is 5 mm, and the load of the second spring 38 at that point is 3 kg.

In this way, even if the length of the endless chain 9 is varied due to the wearing, the movable stroke of the plunger 34 can be always maintained at 7.5 mm which is necessary and sufficient. Moreover, the neutral position of the plunger 34 can be maintained substantially at the center of the stroke and hence, it is possible to reliably prevent the increase and decrease in tension of the endless chain 9 caused by the operation of the engine E. If the possible amount of retracting movement of the plunger 34 from the neutral position is too large, the endless chain 9 may ride across the sprocket teeth during stopping of the engine E and the plunger 34 may be retracted to a limit position, in some cases. If the engine E is restarted in this state, the loosening of the tensioned side of the endless chain 9 becomes too large, and a wrong meshing is caused. However, the possible distance of retracting movement of the plunger 34 is limited to 7.5 mm to 5 mm at the maximum and hence, the wrong meshing can be prevented.

Although in the embodiment described above, the endless transmitting member is an endless chain 9, the endless transmitting member is not limited to the endless chain 9 and may be an endless belt.

As discussed above, the tensioner includes the plunger holder which is longitudinally, slidably carried in the housing, the first spring for biasing the plunger holder in the advancing direction with respect to the housing, the plunger which is longitudinally slidably carried in the plunger holder, and the second spring having a spring constant larger than that of the first spring for biasing the plunger in the advancing direction with respect to the plunger holder to apply the tension to the endless transmitting member. The ratchet mechanism is adapted to permit the movement of the plunger holder in the advancing direction, and to inhibit the movement of the plunger holder in the retracting direction, and the locking means inhibits movement of the plunger holder in the advancing direction during operation of the endless transmitting member. Therefore, during operation of the endless transmitting member, the plunger can be biased in the advancing direction with respect to the locked plunger holder by the action of the second spring, and the endless transmitting member can be urged by the plunger to prevent loosening.

When the endless transmitting member is stopped, the locking of the plunger holder can be released to balance the resilient forces of the first and second springs with each other. Thus, the plunger holder can be advanced by the ratchet mechanism to compensate for the elongation of the endless transmitting member due to the wearing of the latter, and the amount of plunger protruding in the advancing direction from the plunger holder can be maintained substantially constant. Thus, both the advancing and retracting movement of the plunger can be allowed while reliably preventing the loosening of the endless transmitting member. In this case, the stroke of the plunger may be a distance which is necessary and minimum to compensate for the variation in tension caused by the rotation of the endless transmitting member and hence, when the tension of the endless transmitting member is suddenly varied, an incorrect meshing cannot occur.

The locking means comprises the hydraulic pressure chamber defined between the housing and the plunger holder, and the piston provided on the plunger holder to face the rear portion of the hydraulic pressure chamber. Therefore, the piston can be biased in the retracting direction by the hydraulic pressure in the hydraulic pressure chamber to inhibit the movement of the plunger holder in the advancing direction during operation of the endless transmitting member.

The tensioner includes the hydraulic buffer means for buffering the retracting movement of the plunger. Therefore, when the tension of the endless transmitting member is increased, the plunger can be slowly retracted to prevent the juddering of the endless transmitting member.

The hydraulic buffer means comprises the reaction chamber defined between the plunger and the plunger holder, and the constriction through which oil is forced out of the reaction chamber by the retracting movement of the plunger is passed. Therefore, the plunger can be slowly retracted under the resistance produced when the oil is passed through the constriction.

The ratchet mechanism permits the movement of the plunger holder only in the advancing direction, while the ratchet mechanism is operated one pitch. Therefore, the plunger holder can be reliably advanced through the necessary distance in accordance with the wearing and elongation of the endless transmitting member.

Although the embodiment of the present invention has been described in detail, it will be understood that the present invention is not limited to the above-described embodiment, and various modifications in design may be made without departing from the spirit and scope of the invention defined in claims.

We claim:

1. A tensioner for applying tension to an endless transmitting member and for preventing the loosening thereof, said tensioner comprising:

a housing;

a plunger holder longitudinally, slidably positioned in said housing;

a first spring for biasing said plunger holder in an advancing direction with respect to said housing;

a plunger longitudinally, slidably positioned in said plunger holder;

a second spring having a spring constant larger than that of said first spring, for biasing said plunger in an advancing direction with respect to said plunger holder, to apply tension to the endless transmitting member;

a ratchet mechanism provided between said housing and said plunger holder and operably connected to said plunger holder, to permit the movement of said plunger holder in the advancing direction and to inhibit the movement of said plunder holder in a retracting direction; and a locking means provided between said housing and said plunger holder for inhibiting the movement of said plunger holder in the advancing direction relative to said housing during operation of the endless transmitting member.

2. A tensioner according to claim 1, wherein said locking means comprises a hydraulic pressure chamber defined between said housing and said plunger holder, and a piston provided on said plunger holder, said piston facing a rear portion of said hydraulic pressure chamber.

3. A tensioner according to claim 1, further including a hydraulic buffer means for buffering a retracting movement of said plunger.

4. A tensioner according to claim 3, wherein said hydraulic buffer means comprises a reaction chamber defined between said plunger and said plunger holder, and a constriction for allowing passage of oil forced out of said reaction chamber by the retracting movement of the plunger.

5. A tensioner according to claim 1, wherein said ratchet mechanism includes means for permitting the movement of the plunger holder only in the advancing direction, while said ratchet mechanism is moved one pitch.

6. The tensioner of claim 1 wherein said tensioner is in an operable relationship with an engine such that when the engine is in a stopped state the plunger holder is in a retracted end position.

* * * * *